United States Patent [19]

Ohyabu et al.

[11] 4,275,084
[45] Jun. 23, 1981

[54] FORMED FOOD PRODUCT OF MICROFIBRILLAR PROTEIN AND PROCESS FOR THE PRODUCTION THEREOF

[75] Inventors: Shuzo Ohyabu, Kurashiki; Syozi Kurosaki, Okayama; Keiji Matsumura; Hiroyuki Akasu, both of Kurashiki; Takeo Akiya, Takatsuki; Naoki Yagi, Suita; Kwang Y. Kim, Habikino; Tarushige Nakaji, Yao; Akiko Miyanaka, Osaka, all of Japan

[73] Assignees: Kuraray Co., Ltd.; Minaminihon Rakuno Kyodo Kabushiki Kaisha, both of Japan

[21] Appl. No.: 102,483

[22] Filed: Dec. 11, 1979

[30] Foreign Application Priority Data

Dec. 13, 1978 [JP] Japan ................... 53/155076

[51] Int. Cl.$^3$ ............................................. A23J 3/00
[52] U.S. Cl. .................... 426/104; 426/250; 426/274; 426/574; 426/656; 426/657; 426/802
[58] Field of Search ............. 426/104, 274, 574, 656, 426/657, 802, 250

[56] References Cited

U.S. PATENT DOCUMENTS

| | | | |
|---|---|---|---|
| 3,047,395 | 7/1962 | Rusoff et al. | 426/104 |
| 3,320,070 | 5/1967 | Hartman | 426/104 |
| 3,801,713 | 4/1974 | Tolstoguzov et al. | 426/274 X |
| 3,953,612 | 4/1976 | Coplan et al. | 426/104 |
| 3,982,004 | 9/1976 | Obata et al. | 426/104 X |
| 3,988,485 | 10/1976 | Hibbert et al. | 426/104 |
| 4,165,392 | 8/1979 | Kawai et al. | 426/802 X |

FOREIGN PATENT DOCUMENTS 533192  11/1956  Canada ....................... 426/574

*Primary Examiner*—Robert A. Yoncoskie
*Attorney, Agent, or Firm*—Jones, Tullar & Cooper

[57] ABSTRACT

There is disclosed a formed food product of microfibrillar protein comprising a bundle of microfibrillar protein having a diameter of fiber of 10μ or less and a high heat resistance (A) and a microfibrillar protein having a diameter of fiber of 10μ or less and a low heat resistance (B) and optionally one or more fillers and/or other additives, which has similar structure and texture to those of cooked natural meats and has excellent stability to hot water cooking, excellent shape retention and good texture, and hence is useful as an artificial meat product.

16 Claims, No Drawings

FORMED FOOD PRODUCT OF MICROFIBRILLAR PROTEIN AND PROCESS FOR THE PRODUCTION THEREOF

The present invention relates to a formed food product of microfibrillar protein which has excellent stability to hot water cooking, excellent shape retention and good palatability, and to a process for the production of the formed food product. More particularly, it relates to a formed food product comprising a bundle of microfibrillar protein having a high softening temperature and microfibrillar protein having a low softening temperature and optionally one or more fillers and other additives, which has a similar structure and texture similar to those of cooked natural meats and has an excellent stability to hot water cooking, excellent shape retention and good texture. The formed food product of the present invention can easily and widely be incorporated with fats, carbohydrates, heat coagulable meats, and has processability similar or greater than that of natural meats (particularly, greater oven-heat resistance), and hence, it is more convenient to cook than natural meats, is homogeneous, has shelf stability and is also produced in high yield.

Natural meats and muscles of animals have a composite structure comprising muscle-fibers and collagen protein tissues which fill the gaps of the muscle-fibers; blood vessels, fatty cells, lymph glands, fats, carbohydrates and soluble protein components which are mostly dispersed in the collagen tissues. In addition to the muscle-fibers there are bundles of myofibrils which are arranged in parallel and comprise substantially orientated proteins having a high molecular weight, such as actin, myosin, etc. The bundle of myofibrils is characterized in that the bundle has a high water content and the fibrils are free from each other. On the other hand, the collagen tissues are highly stretchable gel comprising predominantly mucoproteins such as elastin which has comparatively little orientation. The collagen tissues have far lower strength and toughness than the muscle-fibers. The collagen tissues function to keep the shape of a meat (shape retention) and to loosely cross-link fibers so that the tissues do not lose texture properties, and further function to retain filling and other components such as fats, carbohydrates, flavors, extracts, etc. which are necessary to give the taste and cooking properties of a food meat. Food meats show unique appearance, texture and taste owing to the above structural characteristics.

Recently, various studies have been done on artificial fibrous protein foods such as meat-simulating fibrous protein food. However, these studies have been done ignoring the above structural characteristics of the natural meats. According to the known method for the production of artificial fibrous protein food, heat coagulable proteins such as egg albumin, ground fish paste and meat paste are used as binders in order to give the desired integrity and shape retention. However, when a binder is used, the formed food product becomes a sponge-like or rubber-like odd textured product because of the increased non-fibrous portion, and because of binding between the whole surface of fiber phase and the filler phase. As a result, the food product shows inferior fibrous texture and increased rubber-like or dough-like odd texture, and hence, does not show the desired meat-like palatability. Moreover, the heat coagulable proteins used as a binder are expensive and have to be used in a large amount in order to obtain a product having sufficient shape retention to tolerate cooking.

Artificial fibrous protein foods have also been produced by needling an eatable fibrous protein, thereby mechanically interlocking the fibers without using a binder. However, in this method, the fibers are cut during the needling resulting in a lowering of the integrity of the final formed food product. Further the mechanical interlocking can not give sufficeint cross-linking and binding of the fibrils, and hence, the product can not keep its solid structure, and tends to be disintegrated on further cooking. Thus, there has never been known any artificial formed food product which satisfies all conditions such as texture, appearance, processability and cooking properties.

The present inventors have already found a method for the production of a fibrous protein food product having a net structure comprising a bundle of microfibrils (multifibrils) which are arranged in parallel by contact-bonding of single protein multifibril with heating at a specific temperature range without using any binder (cf. Japanese Patent Publication (unexamined) No. 133663/1978). The product produced by this method shows excellent integrity in a hot water resistant test, that is, when the product is immersed in hot water of 80° C. for 2 hours, it does not come to pieces, but at a higher temperature more than 100° C., the product becomes partially disintegrated and further loses somewhat its texture due to swelling. Thus, the product of this method is still somewhat inferior in its stability to hot water cooking and integrity.

As a result of a further intensive study by the present inventors, it has now been found that a formed food product comprising a bundle of microfibrillar protein having a high softening temperature and a microfibrillar protein having a low softening temperature and optionally one or more fillers and other additives shows similar structure and texture to those of cooked natural meats and has excellent stability to hot water cooking, excellent shape retention and good texture. Further, the product can be combined with fats, emulsifiers, carbohydrates, coagulable protein gel, gums, soluble proteins, seasonings, flavors, etc. almost without affecting the dimensions of the network structure and shape retention of the product. Thus, it is possible to obtain a desired food product having similar texture and taste to those of individual meats by varying appropriately the additives such as fats, carbohydrates, etc. so as to fit them to the meat to be simulated with simple, single stage formation.

As a result of studying the relationship between the network structure of the multifibrils and texture, it has also been found that the desired formed food product can easily be produced by controlling texture parameters, particularly, hardness (H), elasticity (E) and cohesiveness (Co) within a fixed range.

The present inventors have further studied the rubber-like odd texture which is detected with difficulty by texturometer measurement but which is occasionally felt when people chew a tough visceral muscle or meat-simulating food in a hot state. As a result, it has been found that this phenomenon has a close relationship to the density of the node of the network structure of the multifibrils and its mobility to the filler phase and that it is preferable to incorporate a substance which is free from the surface of the fibers composing the network structure and which can inhibit the binding of other components, for instance, a heat coagulated protein gel, in order to prohibit the phenomenon of rubber-like odd texture. In this embodiment, it is not necessary to use any conventional binding agent such as egg white, ground fish paste, meat pastes, while they may be incorporated as a filler merely for the purpose of improving the texture of the product. Besides, even if they are used, more available materials can be used. For instance, when a meat paste is used as a binder as in the conventional meat-simulating food, a sufficiently fresh meat should be used to give a complete binding. But on the other hand, in the present invention, such a fresh product is not necessary, but a ground meat product denatured with heat may rather preferably be used. Besides, when an egg white is used as a binder in the conventional meat-simulating food, it is usually used in the state of unmodified hydrous egg white gel, but in the present invention, a ground product of a modified, coagulated egg white is preferably used.

An object of the present invention is to provide an formed food product of microfibrillar protein having excellent stability to hot water cooking, excellent shape retention and good texture. Another object of the invention is to provide an improved meat-simulating food product which is tolerant to heat treatment at a high temperature such as 100° C. or higher. A further object of the invention is to provide a method for the production of said formed food product. These and other objects and advantages of the invention will be apparent to persons skilled in the art from the following description.

The formed food product of microfibrillar protein of the present invention comprises 1 part by weight of (A) a bundle of microfibrillar protein having a high softening temperature and (B) more than 0.02 to 0.67 part by weight of a microfibrillar protein having a low softening temperature.

The bundle of microfibrillar protein having a high softening temperature (A) denotes a multifibril of heat softening protein fibers having a diameter of 10μ or less (per each fiber) and said multifibril having a heat resistant index as mentioned below of 100 or more. The microfibrillar protein having a low softening temperature (B) denotes a multifibril (bundle), particle or block-like product of heat softening protein fibers having a diameter of 10μ or less (per each fiber) and said microfibrillar protein (B) having a heat resistant index of 55 to (the heat resistant index of the bundle (A) minus 10). The heat resistant index means the maximum temperature, at which 90% or more of the microfibrils are remained when the microfibrillar protein is kept in water of pH 5.5 at a fixed temperature for 30 minutes, wherein heating of the microfibrillar protein is carried out with steam, a microwave range or hot water bath.

The formed food product of microfibrillar protein of the present invention may optionally contain at least one filler and/or additive selected from heat coagulable proteins, fats and oils, emulsifiers, starches, gums, seasonings, flavors, colorants and natural products containing these substances in an amount of not more than 0.4 part by weight per 1 part by weight of the total weight of the bundle of microfibrillar protein having a high softening temperature (A) and the microfibrillar protein having a low softening temperature (B).

The heat softening protein used in the present invention includes all proteins which can maintain their shape and do not have surface fluidization and do not soften in the hydrous state at room temperature, but melt almost reversibly or show surface softening at a high temperature such as a cooking temperature. The microfibrils of protein having a diameter of fiber of 10μ or less are suitable for the bundle of heat softening protein fibers (A). The bundle (A) has a heat resistant index of 100 or more, preferably 100 to 130. The diameter of fiber of the microfibrillar proteins (A) and (B) is usually in the range of 0.05 to 10μ, preferably 0.5 to 5μ.

The microfibrillar protein having a low softening temperature (B) used in the present invention has a heat resistant index of 55 or more but not higher than (the heat resistant index of the bundle (A)—10), so that the microfibrillar protein (B) can act well for binding the bundle (A) under moderate conditions. Suitable starting materials for the microfibrillar protein (A) and (B) are isolated proteins of various legumes (e.g. soy glycinin), cerial proteins (e.g. wheat gluten), milk casein, collagen or the like.

The starting proteins used for the preparation of the bundle of the heat softening protein fibers (A) and the heat softening protein fibers (B) can be stabilized by treating the formed protein product with an acid, neutral salt or cross-linking agent, but the product stabilized by a conventional method is essentially a heat softening substance and hence still deforms or softens when boiled at a temperature of 60° to 100° C. for a long period of time. Accordingly, in order to use the protein for the bundle of microfibrillar protein having a high softening temperature (A), it should be treated with a specific combination of an acid and a neutral salt for a long period of time or should be subjected to crosslinking reaction with a reducing sugar or an aldehyde, by which the heat resistant index thereof is made 100 or more (cf. U.S. Pat. No. 4,165,392 and Japanese Patent Application No. 118480/1977). The bundle of protein fibers (A) and (B) (multifibrils) may be prepared by various conventional methods, such as extrusion molding with a multi-hole spinneret, fibrillation by drawing and tearing of film, fibrillation by spraying or agitation of a highly viscous slurry of a protein, fibrillation by giving dough a shearing stress between rollers or kneading with addition of a dehydration agent, or the like. The bundle of microfibrillar protein having a high softening temperature (A) may be used in various shapes, such as a sheet-like, plate, bar, block-like, or other various shapes. The microfibrillar protein having a low softening temperature may also be used in various shapes, such as a sheet-like, particle, or other various shapes.

The following various experiments were done in order to study the relations of the various parameters and the properties of the formed food product.

EXPERIMENT 1

In order to study the relation between the combination of the bundle of microfibrillar protein having a high softening temperature (A) and the microfibrillar protein having a low softening temperature (B) and the texture of the produced formed product, the following experiment was done by using milk casein as the heat softening protein.

Several kinds of bundles of microfibrillar protein having various heat resistant indexes were prepared by treating a micelle of casein with a protease, fibrillating the resulting gel by giving thereto a stress, pre-stabilizing the fibrillated product in a bath of sulfuric acid, and then subjecting it to an actual stabilization at various degrees by dipping in a boiling saline bath (i.e. in an aqueous sodium chloride solution). The heat resistant index of these products thus obtained was measured in the same manner as described hereinbefore.

A product of microfibrillar casein having a heat resistant index of 100 (A) was cut to give a thin-rectangular product having a cross area of bundle of about 1 mm$^2$ and a length of about 30 mm. Separately, a product of microfibrillar casein having a heat resistant index of 80 (B) was finely cut to give particle shape product. The former product (A) (1 part by weight) was mixed with various amount (7/3 to 1/49 part by weight) of the latter product (B). The mixture (200 g) was enveloped with a heat resistant film so that moisture did not evaporate, and then heated for 4 minutes with a microwave range (2,450 MHz, 500 W), wherein the maximum temperature was about 98° to 99° C. By this heat treatment, the product having a lower heat resistant index (B) softened and melted at the surface and the product (bundle) of microfibrillar casein having a higher heat resistant index (A) was adhered to the product (B) at the contacted surface portion. The samples thus obtained were charged into a cylindrical mold (cross area: 140 cm$^2$, height: 5 cm) and were molded with a load of 1 kg/cm$^2$ for 5 minutes.

Various products having different ratios of the component of a higher heat resistant index (A) and the component of a lower heat resistant index (B) were tested on the integrity by boiling them in a hot water of 100° C. for 15 minutes. Their integrity was evaluated as follows.

⊚ : No disintegration was observed.

o: A little extrication and a swelling were observed.

x: The product almost came to pieces and the shape of the formed product could not be maintained.

In addition, the texture parameter: elasticity (E) of the products was measured with a commercially available texturometer (made by Zenken K. K.) under the conditions of temperature: 20° C., voltage: 2.5 V (using 1/5 attenuator), plunger: 13 mmΦ aluminum plunger (plane type), clearance: 2 mm, thickness of test sample: 13 mm, chart speed: 750 mm/minute, bite speed: 12 bites/minute, and viscosity index: 8.5.

Moreover, the chewing palatability of the products was tested by panelists.

The results are shown in Table 1.

TABLE 1

| Run No. | Component (A) of high heat resistant index (= 100) (part by weight) | Component (B) of low heat resistant index (= 80) (part by weight) | Integrity (100° C. × 15 min.) | Chewing palatability | Elasticity (E) |
|---|---|---|---|---|---|
| 1 | 1 | 7/3 | ⊚ | Bad | 0.47 |
| 2 | 1 | 1 | ⊚ | Bad | 0.60 |
| 3 | 1 | ⅜ | ⊚ | Excellent | 0.75 |
| 4 | 1 | 1/9 | ⊚ | Excellent | 0.95 |
| 5 | 1 | 1/20 | o | Excellent | 1.30 |
| 6 | 1 | 1/40 | o | Excellent | 1.30 |
| 7 | 1 | 1/49 | x | Excellent | 1.30 |

As is clear from the above test results, when the addition ratio of the component (B) of a low heat resistant index is over ⅔ part by weight (i.e. about 0.7 part by weight) per 1 part by weight of the component (A) of a high heat resistant index, the formed product shows an excellent integrity, but it is difficult to obtain a formed product having an excellent texture similar to that of the cooked natural meats. It is also clear that when the elasticity (E) is more than about 0.70, the chewing palatability is excellent. On the other hand, when the ratio of the component (B) is lower than about 1/49 part by weight (i.e. about 0.02 part by weight) per 1 part by weight of the component (A), the formed product shows an extremely high elasticity, but the softening components in the fiber bundle becomes too small, and hence, the product shows very low integrity, and when the product is boiled in hot water of 100° C. for 15 minutes, it tends to disintegrate and can not maintain its original shape.

Thus, the microfibrillar protein having a low softening temperature (B) is used in an amount of from more than 0.02 to less than 0.7 part by weight, preferably from 0.025 to 0.5 part by weight, per 1 part by weight of the bundle of microfibrillar protein having a high softening temperature (A).

EXPERIMENT 2

There was also tested the relationship between the shape (e.g. cross area) of the bundle of microfibrillar protein having a high softening temperature (A) and the properties of the formed product such as integrity and texture as follows.

There were produced various samples of a bundle of microfibrillar protein having a diameter of fiber of about 4μ (length of the bundle: about 30 mm, cross area of the bundle: 0.001-100 mm$^2$) as each bundle has a nearly square cross section. The products thus prepared (A) (each 1 part by weight) were mixed with the finely cut product (B) as prepared in Experiment 1 (3/7 part by weight). The mixture (200 g) was enveloped with a heat resistant film so that moisture did not evaporate, and then heated for 4 minutes with a microwave range (2,450 MHz, 500 W), and immediately charged in a mold wherein it was molded with a load of 1 kg/cm$^2$ for 5 timutes.

The various formed products thus obtained were subjected to a test of integrity by boiling them in hot water of 100° C. for 15 minutes, and also to a measurement of texture parameters with a texturometer and an organoleptic test (chewing palatability) by panelists in the same manner as described in Experiment 1. The results are shown in Table 2.

TABLE 2

| Run No. | Cross area of bundle (A) (mm$^2$) | Integrity (100° C. × 15 min.) | Chewing palatability | Texture parameters | | | $H \times E \over Co$ |
|---|---|---|---|---|---|---|---|
| | | | | Hardness (H) | Elasticity (E) | Cohesiveness (Co) | |
| 1 | 0.001 | ⊚ | Bad | 7.50 | 0.49 | 0.80 | 4.59 |
| 2 | 0.01 | ⊚ | Excellent | 7.11 | 0.78 | 0.76 | 7.30 |
| 3 | 0.5 | ⊚ | Excellent | 6.72 | 0.96 | 0.74 | 8.72 |
| 4 | 1 | ⊚ | Excellent | 5.79 | 1.30 | 0.71 | 10.60 |
| 5 | 20 | ⊚ | Good | 5.42 | 1.31 | 0.68 | 10.44 |
| 6 | 100 | x | Bad | 5.09 | 1.32 | 0.60 | 11.20 |

As is clear from the above results, when the bundle of microfibrillar protein having a high softening temperature (A) has a cross area of less than 0.01 mm², the formed product shows extremely excellent integrity, but has too fine and too homogeneous bundle structure, which results in bad chewing palatability which is very different from that of cooked natural meats. On the other hand, when the bundle of microfibrillar protein having a high softening temperature (A) has a cross area of more than 20 mm² (i.e. around 4.5 mm square section), the formed product shows inferior chewing palatability and less integrity, and when the product, of which the bundle (A) has a cross section of around 10×10 mm square, is boiled in hot water of 100° C. for 15 minutes, it tends to disintegrate. Such tendency however also depends on the shape of cross section of the bundle (A) and the product where bundle (A) has a high aspect ratio of cross section (i.e. thin and wide) shows better integrity and chewing palatability than that of square one. Hence, the cross area may occasionally be much larger than 20 mm². For example, the product where bundle (A) has a cross section of around 50 mm × 1 mm rectangle (e.g. sheet-like) shows equally excellent integrity and chewing palatability as that of the product where bundle (A) has a cross section of not more than 4.5 mm².

Based on the above results, it has been found that there is a certain relationship between the chewing palatability and the texture parameters. That is, according to the results of the above organoleptic text, in case of products having a similar chewing palatability of that of cooked natural meat, the values of H, E, Co and H×E/Co are in the following ranges, respectively.

$4.55 \leq H \leq 7.50$
$0.70 \leq E \leq 1.35$
$0.60 \leq Co \leq 0.85$
$4.95 \leq H \times E/Co \leq 11.10$ The bundle of microfibrillar protein having a low softening temperature (B) may be used in various forms in addtion to the finely cut particle product as used in the above experiments, such as a block-like product, or the like. It is, however, preferable to use the components of a low softening temperature (B) in the form of smaller size than the bundle of fiber having a high softening temperature (A) so that the component (B) can easily and uniformly be dispersed into the gaps of the bundle of fiber having a high softening temperature (A). Besides, the component of a low softening temperature (B) may not necessarily have microfibrillar structure, but non-fibrous heat softening proteins (e.g. in the form of a particle) may be used if it has a heat resistant index of 55 to (the heat resistant index of the component (A)—10). However, when such a non-fibrous protein is used as the component of a low softening temperature (B), the produced formed food product contains a larger amount of non-fibrous components, which results in an inferior texture. Accordingly, it is preferable to use microfibrillar protein having a diameter of fiber of 10μ or less and the specified heat resistant index as the component (B). It may, of course, be desirable to use partially the non-fibrous protein in addition to the microbifibrillar protein as the component (B).

Moreover, it is not necessarily required to use a separate microfibrillar protein having a low softening temperature as the component (B), but instead thereof, the bundle of microfibrillar protein having a high softening temperature (A) may previously be treated with a buffer solution having a pH of 6.0 to 6.9, preferably about 6.5, and thereby, a layer of microfibrillar protein having a low softening temperature corresponding to the component (B) can be formed on the surface of the bundle (A). That is, the bundle of microfibrillar protein having a high softening temperature (A) in various forms such as sheet-like, plate, bar, block-like shapes is treated (e.g. by spraying and by coating) with a certain amount of a buffer solution having a pH of 6.0–6.9. By this treatment, a limited thickness of the surface layer of the bundle (A) is converted into the component having a low softening temperature (B). The limited thickness of the layer converted into (B) can be controlled by the quantity of added buffer solution so as to give the expected weight ratio of B/A as mentioned above. The buffer solution includes all buffer solutions of pH of 6.0 to 6.9 containing a combination of acids and bases and salts thereof which are usable as a food additive. Examples of the buffer solution are acetate buffer solutions (e.g. N/10 acetic acid-M/10 sodium acetate buffer solution), phosphate/citrate buffer solutions (e.g. M/5 disodium hydrogen phosphate-M/10 citric acid buffer solution), phosphate buffer solutions (e.g. M/15 potassium dihydrogen phosphate-M/15 disodium hydrogen phosphate buffer solution). Moreover, these buffer solutions may contain acidic polysaccharides (e.g. sodium alginate), meat extract, meat flavor and so on.

The desired formed food product of the present invention can be produced in the following manner.

When a sheet-like bundle of microfibrillar protein having a high softening temperature (A) is used, plural sheet-like bundles are piled up, and the microfibrillar protein having a low softening temperature (B) in the form of a sheet-like, particle or block-like product is inserted or dispersed between the piled bundles (A). When the sheet-like bundles (A) are treated with a buffer solution to modify the surface thereof in order to convert the surface into the layer having a low softening temperature corresponding to the component (B) as mentioned above, they can be piled up as they stand without additionally using the microfibrillar protein having a low softening temperature (B). The bundles (A) having a modified surface may also be piled up in combination with the bundles (A) having no modified surface. In this case, it also is not necessary to add the microfibrillar protein having a low softening temperature (B). When bundles of microfibrillar protein having a high softening temperature (A) in the form of plate, bar, block-like product are used, they are regularly or randomly mixed with the microfibrillar protein of a low softening temperature (B) in the form of particle, block-like product. When the plate, bar or block-like bundles (A) are treated with a buffer solution as mentioned above, they also can be mixed together without using additional microfibrillar protein having a low softening temperature (B).

The piled or mixed product thus obtained is then subjected to heat treatment. The heat treatment should be done at a temperature of lower than the heat resistant index of the component (A) but higher than that of the component (B). The heat treatment is usually carried out at the specified temperature for about 30 seconds to about 1 hour, so that the component (B) softens or melts at its surface and thereby the bundles (A) are added to the bundle (B). During the heat treatment, the piled or mixed product is simultaneously pressed under a pressure of 0.1 to 50 kg/cm², for example, by molding, to form the product into the desired form. When the temperature of heat treatment is over the heat resistant index of bundles (A), bundles (A) also partialy soften or melt at their surface and therefore, the resulting formed product shows inferior texture and chewing palatability. On the other hand, when the temperature for heat treatment is lower than the heat resistant index of component (B), component (B) does not soften or melt at its surface and hence, the formed food product shows extremely inferior integrity. Besides, when the heat treatment time is shorter than 0.5 minute, the heat is not transmitted into the innerpart of the formed product because protein products usually have a low thermal conductivity, and hence, component (B) can not be softened sufficiently or made molten at its surface. On the other hand, when the heat treatment time is longer than 1 hour, the cost for heat energy becomes too high.

0.5 mm$^2$, 1 part by weight) was mixed with a microfibrillar protein having a low softening temperature (B) (heat resistant index: 80, ⅔, ⅓ or 1/20 part by weight) to prepare three samples. To the samples of (A) and (B) was each added a palm oil/hardened coconut oil mixture in an amount of 0 to about 30% by weight as shown in Table 3. The mixture was mixed well and subjected to heat treatment under a pressure to give formed products.

The formed products thus obtained were subjected to a test of integrity by boiling in hot water of 100° C. for 15 minutes; and also to a measurement of texture parameters with a texturometer and a test of chewing palatability by panalists in the same manner as described in Experiment 1. The results are shown in Table 3.

TABLE 3

| Run No. | Component (A) of high heat resistant index (= 100) (parts by weight) | Component (B) of low heat resistant index (= 80) (part by weight) | Additive (part by weight)* | Integrity (100° C. × 15 min.) | Chewing palatability | Hardness (H) | Elasticity (E) | Cohesiveness (Co) | H × E / Co |
|---|---|---|---|---|---|---|---|---|---|
| 1 | 1 | ⅔ | 0 | ◎ | Excellent | 7.50 | 0.67 | 0.85 | 5.91 |
|   | 1 | ⅔ | 1/24 | ◎ | Excellent | 7.01 | 0.81 | 0.82 | 6.92 |
|   | 1 | ⅔ | 1/6 | ◎ | Excellent | 6.20 | 0.95 | 0.76 | 7.75 |
|   | 1 | ⅔ | ⅓ | o | Excellent | 5.21 | 0.87 | 0.65 | 6.97 |
|   | 1 | ⅔ | ⅔ | Δ | Bad | 3.49 | 0.35 | 0.57 | 2.14 |
| 2 | 1 | ⅓ | 0 | ◎ | Excellent | 7.02 | 0.80 | 0.85 | 6.61 |
|   | 1 | ⅓ | 1/24 | ◎ | Excellent | 6.40 | 1.05 | 0.80 | 8.40 |
|   | 1 | ⅓ | 1/6 | ◎ | Excellent | 5.22 | 1.30 | 0.74 | 9.17 |
|   | 1 | ⅓ | ⅓ | o | Excellent | 4.03 | 0.85 | 0.60 | 5.71 |
|   | 1 | ⅓ | 1/2.5 | o | Excellent | 4.01 | 0.83 | 0.59 | 5.64 |
|   | 1 | ⅓ | ⅓ | Δ | Bad | 3.10 | 0.58 | 0.55 | 3.27 |
| 3 | 1 | 1/20 | 0 | ◎ | Excellent | 6.81 | 0.85 | 0.82 | 7.06 |
|   | 1 | 1/20 | 1/40 | ◎ | Excellent | 6.20 | 1.10 | 0.78 | 8.74 |
|   | 1 | 1/20 | 1/20 | ◎ | Excellent | 5.68 | 1.31 | 0.71 | 10.48 |
|   | 1 | 1/20 | ¼ | o | Excellent | 4.02 | 0.87 | 0.59 | 5.93 |
|   | 1 | 1/20 | 1/2.5 | o | Excellent | 4.01 | 0.82 | 0.58 | 5.67 |
|   | 1 | 1/20 | ⅓ | x | Bad | 3.19 | 0.55 | 0.54 | 3.25 |

*Part by weight to 1 part by weight of the total weight of (A) and (B).

Moreover, the pressure molding is carried out under a pressure, at which the microfibrillar structure of the product is not lost. Suitable pressure is in the range of 0.1 to 50 kg/cm$^2$. The heat treatment may be carried out by using appropriate heating means such as an electronic furnace (heater), a microwave range, steam, hot water bath, heating with heat transfer medium, or the like.

The formed food product of the present invention may contain one or more fillers and/or other additives in addition to the bundle of microfibrillar protein having a high softening temperature (A) and the microfibrillar protein having a low softening temperature (B).

In order to study on the effect of the incorporation of fillers and/or other additives the following experiments have been done.

EXPERIMENT 3

A bundle of microfibrillar protein having a high softening temperature (A) (heat resistant index: 100, length of the bundle: about 30 mm, cross area of bundle: about As is clear from the above results, when the additive is used in the ratio of larger than 1/2.5 part by weight per 1 part by weight of the total weight of the components (A) and (B), the formed product shows inferior integrity and chewing palatability.

Based on the above results, it has also been found that in case of the products having similar chewing palatability to that of cooked natural meat, the values of H, E, Co and H×E/Co are in the range of the following ranges, respectively.

3.10 ≦ H ≦ 7.50
0.60 ≦ E ≦ 1.35
0.58 ≦ Co ≦ 0.85
3.50 ≦ H × E/Co ≦ 11.10

In addition, the above experiment was repeated except that additives selected from isolated soy bean protein, minced animal meat, ground fish paste, gelatine, gum (carrageenan), starch were used instead of the palm oil/hardened coconut oil mixture. The results are shown in Table 4.

TABLE 4

| Run No. | Component (A) of high heat resistant index (= 100) (part by weight) | Component (B) of low heat resistant index (= 80) (part by weight) | Additives Kind | Amount (part by weight)* | Integrity (100 C. × 15 min.) | Chewing palatability | Hardness (H) | Elasticity (E) | Cohesiveness (Co) | H × E / Co |
|---|---|---|---|---|---|---|---|---|---|---|
| 1 | 1 | ⅔ | Isolated soy bean protein | 1/6 | o | Bad | 4.60 | 0.61 | 0.84 | 3.34 |

TABLE 4-continued

| | Component | | Additives | | Integrity (100 C. × 15 min.) | Chewing palatability | Texture parameters | | | |
|---|---|---|---|---|---|---|---|---|---|---|
| Run No. | Component (A) of high heat resistant index (= 100) (part by weight) | Component (B) of low heat resistant index (= 80) (part by weight) | Kind | Amount (part by weight)* | | | Hardness (H) | Elasticity (E) | Cohesiveness (Co) | $\dfrac{H \times E}{Co}$ |
| 2 | 1 | ⅔ | Minced animal meat | 1/6 | ◉ | Excellent | 6.09 | 0.94 | 0.77 | 7.43 |
| 3 | 1 | ⅔ | Ground fish paste | 1/6 | ◉ | Excellent | 6.02 | 0.92 | 0.75 | 7.38 |
| 4 | 1 | ⅔ | Gelatin | 1/6 | ◉ | Excellent | 5.91 | 0.86 | 0.73 | 6.69 |
| 5 | 1 | ⅔ | Gum (carrageenan) | 1/6 | ◉ | Excellent | 5.83 | 0.86 | 0.74 | 6.78 |
| 6 | 1 | ⅔ | Starch | 1/6 | ◉ | Excellent | 5.44 | 0.84 | 0.72 | 6.35 |

*Part by weight to 1 part by weight of the total weight of (A) and (B).

As is clear from the above results, when a heat softening protein such as isolated soy bean protein is used, the network structure of protein fiber disappears because of excess fusion with the heat softening protein, and hence, the formed product is inferior in texture, while it has a good integrity. That is, such a product is inferior in chewing palatability and the value of H×E/Co is outside of the above-mentioned range, while the values of respective texture parameters of H, E and Co are included within the above-mentioned ranges.

When other additives shown in Table 4 are used, they are dispersed between the gaps of the bundles of the heat softening protein fiber, but when they are used in an amount of more than 1/2.5 parts by weight, particularly more than 0.5 part by weight, per 1 part by weight of the components (A) and (B) having network structure, the phases of the additives are linked to each other and therefore the formation of network structure is hindered and the network structure becomes scattered among the structure of the additives. As a result, the formed product shows an unsatisfactory homogeneous cross view and is also inferior in texture parameters.

The formed products are very similar to cooked natural animal meats and show similar chewing palatability, and texture to those of cooked natural meats. However, when the products are cooked with hot water or a heater such as a microwave range, and are eaten in a hot state as at 40° C., they show a rubber-like odd texture, and when they are eaten in a hotter state as at 60° C., the feeling of a rubber-like odd texture is increased.

It has been found that when an unmodified egg white protein is used as the additive and a formed product is prepared by using unmodified protein in an amount of about 0.1 part by weight per 1 part by weight of the total weight of the components (A) and (B) in the same manner as described in Experiment 3, the formed product shows inferior integrity, because the unmodified egg white protein easily dissolves in the surface free water contained in the tissue of the bundles of microfibrillar protein and the binding of the bundles is hindered by the coated layer of the egg white protein coagulated during the heat treatment.

As a result of further study by the present inventors, it has been found that when unmodified egg white protein is subjected to preheating in the state of a hydrous gel to make it insoluble in water, and the water-insoluble egg white protein thus prepared is used as a filler, there can be obtained a formed food product having a low rubber-like odd texture, as shown in the following experiment.

EXPERIMENT 4

A commercially available dried egg white powder (1 part by weight) was mixed with water (2 parts by weight) to give an egg white gel having a water content of about 66% by weight. The hydrous egg white gel thus obtained was heated at 70° C. for 5 minutes to coagulate the gel (this heat treatment should be done at not so a long period of time at a high temperature, because water vaporized off too much and the egg white gel becomes too hard). The coagulated egg white protein was roughly cracked and then finely pulverized with a strainer or the like to give a modified, coagulated protein powder having a water content of about 66% by weight and a diameter of about 1 mm (25 mesh).

Separately, a bundle of microfibrillar protein having a high softening temperature (A) (heat resistant index: 100, cross area of bundle: about 1 mm², length of the bundle: about 30 mm, 1 part by weight) was mixed with a microfibrillar protein having a low softening temperature (B) (heat resistant index: 80, ⅔, ⅓ or 1/20 part by weight) to prepare three samples. To the prepared samples of (A) and (B) was each added the modified, coagulated protein powder obtained above in the ratio as shown in Table 5, and the mixture was mixed well with agitation.

The mixtures thus prepared (200 g) were each enveloped with a heat resistant film so that moisture did not evaporate, and then heated for 4 minutes with a microwave range (2,450 MHz, 500 W), and immediately charged in a mold wherein they were molded with a load of 1 kg/cm² for 5 minutes.

The formed products thus obtained were subjected to a test of integrity by boiling them in hot water of 100° C. for 15 minutes. Besides, the rubber-like odd texture of the products was tested by chewing them in a hot state (at 40° C.) by 10 panellists. The degree of rubber-like odd texture was evaluated as follows:

1: No one among 10 panelists felt the rubber-like odd texture.

2: One to 4 persons among 10 panelists felt the rubber-like odd texture.

3: Five or more persons among 10 panelists felt the rubber-like odd texture.

The results are shown in Table 5.

TABLE 5

| Run No. | Component (A) of high heat resistant index (= 100) (part by weight) | Component (B) of low heat resistant index (= 80) (part by weight) | Filler (25 mesh, modified egg white powder) (part by weight)* | Integrity | Degree of rubber-like odd texture |
| --- | --- | --- | --- | --- | --- |
| 1 | 1 | ⅔ | 0 | ◎ | 3 |
|  | 1 | ⅔ | 1/24 | ◎ | 2 |
|  | 1 | ⅔ | 1/6 | ◎ | 1 |
|  | 1 | ⅔ | ¼ | ○ | 1 |
|  | 1 | ⅔ | ⅔ | △ | 1 |
| 2 | 1 | ¼ | 0 | ◎ | 3 |
|  | 1 | ¼ | 1/24 | ◎ | 2 |
|  | 1 | ¼ | 1/6 | ◎ | 1 |
|  | 1 | ¼ | ¼ | ◎ | 1 |
|  | 1 | ¼ | 1/2.5 | ○ | 1 |
|  | 1 | ¼ | ½ | △ | 1 |
|  | 1 | ¼ | ⅔ | x | 1 |
|  | 1 | ¼ | 5/6 | x | 1 |
| 3 | 1 | 1/20 | 0 | ◎ | 3 |
|  | 1 | 1/20 | 1/40 | ◎ | 2 |
|  | 1 | 1/20 | 1/20 | ◎ | 1 |
|  | 1 | 1/20 | ¼ | ◎ | 1 |
|  | 1 | 1/20 | 1/2.5 | o | 1 |
|  | 1 | 1/20 | ½ | x | 1 |
|  | 1 | 1/20 | ⅔ | x | 1 |

*Part by weight to 1 part by weight of the total weight of (A) and (B).

As is clear from the above results, when a filler is added to the mixture of the (A) and (B) in an amount of 1/49 (about 0.02) part by weight per 1 part by weight of the total weight of the mixture of components (A) and (B), the rubber-like odd texture of the formed food product is extremely decreased, and when it is used in an amount of 1/9 (about 0.05) part by weight per 1 part by weight of total weight of the mixture of components (A) and (B), no rubber-like odd texture is felt. On the other hand, when the filler is used in a too large amount, as over ½ (0.5) part by weight per 1 part by weight of the total weight of the mixture of components (A) and (B), the resultant product shows low integrity. Thus, the filler is used in an amount of about 0.02 to less than 0.5 part by weight, preferably 0.02 to 0.4 part by weight, per 1 part by weight of the total weight of the mixture of components (A) and (B).

In addition, when the particle size of the filler is too small, such as smaller than about 120 mesh, the filler does not provide sufficient lowering of the rubber-like odd texture, and on the other hand, when the filler is too large size, such as larger than about 10 mesh, the heat softening and binding of the components (A) and (B) are somewhat hindered, and hence, the formed product shows inferior integrity. Thus, the filler preferably has a size of about 10 to 120 mesh.

The fillers used in the present invention include heat coagulable proteins such as egg white, egg yolk, milk whey protein, blood serum, animal meats, poultry meats, ground fish paste, gelatine and natural substances containing these proteins as the main component, which are modified and coagulated by heating. The fillers may be in the form of fiber, flake, particle or the like.

The formed food product of the present invention may incorporate other additives such as fats and oils, emulsifiers, starches, gums, seasonings, flavors, colorants, or the like as mentioned hereinbefore, in addition to the fillers. The formed food product may be prepared by mixing the starting microfibrillar protein (A) and (B) with the filler and other additives and then forming the mixture into a desired form; or may be prepared by forming a mixture of the starting microfibrillar protein (A) and (B) with the filler and then immersing the formed product in a solution or dispersion of the other additives. In any case, there can be obtained the desired formed food product having a beautiful appearance, excellent cooking stability and excellent taste closely resembling a cooked natural meat.

The present invention is illustrated by the following Examples, but is not limited thereto.

EXAMPLE 1

Acid casein (100 g) is dispersed in water (400 ml) at 60° C. and thereto is added a 28% aqueous ammonia (5 ml). To the resulting solution is added a 25% aqueous calcium chloride solution (40 ml) to form a micellar structural composition. The micelle is treated with a protease (80 mg) to form a gel composition. The resulting gel composition is orientated and fibrillated by drawing to give a microfibrillar composition. The microfibrillar composition thus obtained is pretreated by dipping it in a 1% aqueous sulfuric acid solution (2 liters) for 5 minutes and then actually stabilized by dipping it in a boiling saline bath for 5 hours. The resulting composition is washed with water and neutralized to give a microfibrillar protein product (A) having a water content of 68% and a diameter of fiber of $2.5\mu$ (210 g). This product shows a heat resistant index of 100.

Separately, a commercially available active gluten powder (1 part by weight) is mixed with water (1 part by weight) and the mixture is kneaded at 50° C. to give an active gluten gel composition. To the active gluten gel composition is added sodium chloride in an amount of 10% by weight, and the mixture is mixed well and orientated by drawing. The sufficiently orientated gluten gel composition is pretreated by dipping it in a boiling saline bath (pH 4) for 1 hour, and washed with water and neutralized to give a microfibrillar gluten product (B) having a diameter of fiber of $4\mu$ and a heat resistant index of 75.

The microfibrillar products (A) and (B) obtained above are each cut so as to have a cross area of bundle of about 1 mm² and length of about 30 mm. The cut product (A) (140 g) and the cut product (B) (60 g) are mixed well. The mixture is mixed with a hardened rape seed oil (30 g) containing 1% by weight of sorbitan fatty acid esters and thereto is added a meat extract (5 g). The mixture is packed in a polypropylene vessel and heated with a microwave range (2,450 MHz, 500 W) for 4 minutes, wherein the maximum temperature is 97°–99° C. Immediately after the heat treatment, the mixture is formed with a load of 1 kg/cm$^2$ to give a formed product (165 g) having a water content of 59% and an oil content of 8%.

When the formed product thus obtained was boiled in boiling water for 15 minutes, no extrication of the fibers was observed, which means that the formed product has excellent integrity. Besides, the formed product was subjected to a test of texture parameter in the same manner as described hereinbefore. As a result, it showed a hardness (H) of 6.90, an elasticity (E) of 0.79, a cohesiveness (Co) of 0.82, and a value of H×E/Co of 6.65. When this product was tested for chewing palatability by panelists, it showed excellent elasticity and chewing palatability.

EXAMPLE 2

A commercially available gluten is cut so as to have a cross area of about 0.5 mm$^2$, and then dipped in a boiling saline bath for 4 hours to give a microfibrillar gluten product in the strip shape (A) having a diameter of fiber of 1.3μ and a heat resistant index of 105.

Separately, a gel composition of acid casein prepared in the same manner as described in Example 1 is orientated by drawing likewise. The resulting fibrous composition is pretreated by dipping it in a 1% aqueous sulfuric acid solution for 5 minutes and then actually stabilized by dipping it in a boiling saline bath for 30 minutes to give a microfibrillar casein product (B) having a heat resistant index of 65. This product is finely cut to give a fine flake product.

The microfibrillar gluten product (A) (140 g) and the microfibrillar casein product (B) (60 g) are mixed well and thereto are added a hardened rape seed oil (20 g) and gelatine (5 g), and the mixture is packed in a thin polypropylene vessel (depth: 1 cm) which is kept in hot water at 80° C. for 10 minutes. Immediately after the heat treatment, the mixture is formed with a load of 2 kg/cm$^2$ for 5 minutes to give a formed product having a water content of 57% and an oil content of 6%.

When the formed product thus obtained was boiled in boiling water for 15 minutes, no extrication of the fibers was observed, which means that the product has excellent integrity. In addition, the formed product was subjected to the test of texture parameters. As a result, it showed a hardness (H) of 4.10, an elasticity (E) of 0.87, a cohesiveness (Co) of 0.62 and a value of H×E/Co of 5.75. When this product was tested for chewing palatability by panelists, it showed excellent elasticity and chewing palatability.

EXAMPLE 3

In a 20% aqueous potassium carbonate solution (800 ml) are dissolved at 50° C. casein (200 g) and a soy bean protein (20 g) having a protein content of 55%, and thereto is added a 30% aqueous calcium chloride solution to form a micellar structural composition. The micelle is treated with a protease (400 mg) to form a gel composition. The gel composition is orientated and fibrillated by drawing to give a microfibrillar composition (840 g). The microfibrillar composition (750 g) is pretreated by dipping it in a stabilizing solution containing 1% by weight of phytic acid for 5 minutes and then actually stabilized by dipping it in a boiling saline bath and washed with water and neutralized to give a microfibrillar product (A) (712 g) having a diameter of fiber of 1.5μ and a heat resistant index of 100.

The remaining microfibrillar composition (90 g) obtained after orientation and fibrillation in the above procedure is merely pretreated in the same manner as described above to give a microfibrillar product (B) having a diameter of fiber of 1.5μ and a heat resistant index of 60.

The microfibrillar product (A) (cross area of bundle: 2 mm$^2$) and the microfibrillar product (B) (cross area of bundle: 1 mm$^2$) are each cut so as to have a length of 30 mm, and they are fully mixed.

Separately, an egg white powder is mixed with two-fold amount of water to give a hydrous egg white gel. The gel is coagulated by heating and then pulverized to give coagulated egg white particles (30 mesh) having a water content of about 64%.

The egg white particles (100 g) are added as a filler to the mixture of the microfibrillar products (A) and (B) (800 g), and the mixture is packed in a polypropylene vessel and heated with an industrial high-frequency induction heater (62 MHz, 2 KW) under a pressure of 0.5 kg/cm$^2$ for 3 minutes (at 97°–99° C.) to give a formed product (about 650 g) having a water content of about 59%.

When the formed product thus obtained was boiled in boiling water of 100° C. for 15 minutes, no extrication of the fibers was observed, which means that the product has excellent integrity. Besides, the product was tested for chewing palatability with 10 panelists in a hot state (at 40° C.), but no one felt a rubber-like odd texture, and the product showed excellent elasticity and texture similar to those of cooked natural meats. The product had texture parameters of H=4.80, E=1.01, Co=0.76, and H×E/Co=6.38.

EXAMPLE 4

A mixture of microfibrillar products (A) and (B) (800 g) prepared in the same manner as described in Example 3 is mixed with coagulated egg white particles (300 mesh, 100 g) prepared in the same manner as in Example 3, and thereto are added hardened soy bean oil (100 g) containing 5% by weight of sucrose fatty acid esters, a meat extract (30 g) and carrageenan (50 g), and the mixture is packed in a heat-resistant vessel and heated with an industrial high-frequency induction heater (62 MHz, 2 KW) under a pressure of 0.5 kg/cm$^2$ for 5 minutes while preventing evaporation of water to give a composite formed product (855 g) having a water content of 56% and an oil content of 5%.

When the formed product thus obtained was boiled in boiling water of 100° C. for 15 minutes, no extrication of the fibers was observed, which means that the product has excellent integrity. Besides, the product was tested for chewing palatability by 10 panelists in a hot state (at 40° C.), but no one felt a rubber-like odd texture, and the product showed excellent elasticity and texture similar to those of cooked natural meats. The product had texture parameters of H=3.20, E=0.98, Co=0.74, and H×E/Co=4.24.

As a reference, when the above Example 4 was repeated except that carrageenan (additional 100 g) was used instead of the coagulated egg white particles (100 g), the resulting formed product had excellent integrity and elasticity, but when the product was tested for chewing palatability by 10 panelists in a hot state (at 40° C.), 7 persons felt a rubber-like odd texture.

EXAMPLE 5

A mixture of microfibrillar products (A) and (B) (800 g) prepared in the same manner as described in Example 3 is mixed with a commercially available kamaboko (boiled ground fish paste) (100 mesh, 100 g), and thereto are added a palm oil/hardened coconut oil mixture (100 g) containing 5% by weight of sorbitan fatty acid esters, potato starch (30 g) and meat extract (30 g). The mixture is packed in a heat-resistant vessel, which is heated with steam at an inner temperature of 92° C. for 15 minutes. Immediately after the heat treatment, the mixture is formed under a pressure of 2.8 kg/cm$^2$ with a pressing machine to give a fomed product (890 g) having a water content of 60% and an oil content of 9%.

When the formed product was boiled with boiling water, the product was not disintegrated and showed excellent integrity. Besides, the product was tested for chewing palatability by 10 panelists in a hot state (at 40° C.), but no one felt a rubber-like odd texture, and the product showed excellent elasticity and texture similar to those of cooked natural meats. The product had texture parameters of H=3.60, E=1.05, Co=0.80, and H×E/Co=4.73.

As a reference, when the above Example 5 was repeated except that potato starch (additionally 100 g) was used instead of kamaboko (boiled ground fish paste) (100 g), the resulting formed product had excellent integrity and elasticity, but when the product was tested for chewing palatability by 10 panelists in a hot state (at 40° C.), 6 persons felt a rubber-like odd texture.

EXAMPLE 6

Acid casein is dissolved in a 10% aqueous sodium hydroxide solution to obtain a spinning solution having a concentration of acid casein of 15%. The solution is defoamed, filterd, and extruded through a spinneret (hole diameter: 0.18 mm, number of hole: 30) into a coagulation bath containing sulfuric acid of 50 g/liter, and the resulting spun fibers are oriented and fibrillated by drawing at a rate of 20 m/minute to give a microfibrillar product having a monofilament structure of about 0.3 denier (diameter of monofilament: about 1μ). The microfibrillar product thus obtained (200 g) is dipped in a boiling saline bath and washed with water to give a microfibrillar product (B) (180 g) having a water content of 68% and a heat resistant index of 80.

The microfibrillar product having a multifilament structure of about 0.3 denier obtained above (800 g) is dipped in a boiling bath containing sodium chloride and glucose, and washed with water to give a microfibrillar product (A) (740 g) having a water content of 65% and a heat resistant index of 125.

The former microfibrillar product (B) is finely cut to give a fine block-like (flake) product, and the latter microfibrillar product (A) is cut to give a product having a cross area of bundle of 1.5 mm$^2$ and length of 30 mm, and both products thus obtained are fully mixed.

The mixture thus obtained (900 g) is mixed with a commercially available minced meat (size: 20 mesh, prepared with a chopper, boiled in boiling water, 100 g), and thereto are added pork fats (100 g) and a meat extract (50 g). The mixture is packed in a heat resistant vessel and sealed, and then is heated at 116° C. with an autoclave for 15 minutes to give a formed product (about 1100 g).

When the formed product thus obtained was boiled in boiling water, the bundles of fibers did not peel off, and the product showed excellent integrity without swelling and disintegration. Besides, the product was tested for chewing palatability by 10 panelists in a hot state (at 40° C.), but no one a felt rubber-like odd texture, and the product showed excellent elasticity and texture similar to those of cooked natural meats. The product had texture parameters of H=5.30, E=1.10. Co=0.8, and H×E/Co=7.29.

As a reference, when the above Example 6 was repeated except that an unheated meat paste (100 g) was used instead of the coagulated minced meat (20 mesh, 100 g), the resulting formed product had excellent integrity and elasticity, but when the product was tested for chewing palatability by 10 panelists in a hot state (at 40° C.), 7 persons felt a rubber-like odd texture.

EXAMPLE 7

Acid casein (100 g) is dispersed in water (400 ml) at 60° C., and thereto is added a 38% aqueous ammonia (5 ml). To the solution is added a 25% aqueous calcium chloride solution (40 ml) to form a micellar structural composition. The micelle is treated with a protease (80 mg) to form a gel composition. The resulting gel composition is orientated and fibrillated by drawing through two rollers to give a sheet-like microfibrillar product having a thickness of about 0.6 mm. The microfibrillar product thus obtained is pre-treated by dipping it in a 1% aqueous sulfuric acid solution (2 liters) for 5 minutes and then actually stabilized by dipping it in a boiling saline bath for 5 hours, and thereafter, it is washed with water and neutralized to give a sheet-like microfibrillar product (A) (210 g) having a water content of 68%, a pH of 5.5, thickness of about 0.6 mm and a diameter of fiber of 2.5μ. This product shows a heat resistant index of 100. From this product, there are prepared 70 sheets of samples in a strip shape having a width of 50 mm, a length of 100 mm and a thickness of 0.6 mm (weight: about 3 g per each sheet.)

Separately, in a M/5 disodium hydrogen phosphate-M/10 citric acid buffer solution (pH 6.5) is dissolved 1% by weight of sodium arginate to give a somewhat viscous buffer solution.

The buffer solution thus obtained is uniformly applied in the volume of 0.15 ml onto the individual surface of the above-obtained strip-shaped sample and thereby, one surface of the sample is converted into a bundle of microfibirillar protein having a low softening temperature (heat resistant index=70) which corresponds to the component (B) in the weight ratio of 0.07 part per 1 part of the compound (A). The 70 sheets of sample wherein one surface is converted into microfibril having a low softening temperature are piled up to give a laminated product wherein the microfibrillar protein layer having a high softening temperature and the microfibrillar protein layer having a low softening temperature are mutually arranged.

The laminated product thus obtained is packed in a mold of a width of 50 mm, a length of 100 mm and a depth of 100 mm which is previously heated at 80° C., and the laminated product is heat-pressed at the same temperature under a pressure of 5 kg/cm$^2$ for 30 minutes to give an orientated formed product having a water content of 58%. This product comprises a highly orientated bundle of microfibrils and has a very similar appearance to that of cooked natural meats.

When this product was boiled with boiling water for 15 minutes, no extrication of fibers and no peeling off of the bundles were observed, and hence, the product had excellent integrity. Besides, when this product was tested for chewing palatability by panelists, it showed excellent chewing palatability and elasticity similar to those of cooked natural meats. The product had texture parameters of H=7.15, E=0.86, Co=0.81, and H×E/Co=7.59.

EXAMPLE 8

An orientated laminated product prepared in the same manner as described in Example 7 is cut into small cubes (1 cm×1 cm×1 cm).

Separately, a hardened palm oil (m.p. 38° C.) and sucrose fatty acid esters are mixed to obtain a water in oil type emulsion having an oil content of 60%.

The cut product of the orientated laminated product obtained above is dipped in the above oil emulsion at 70° C. for 30 minutes to give an orientated microfibrillar product having a water content of 51% and an oil content of 8.5%.

The product thus obtained had texture parameters of H=3.80, E=1.01, Co=0.79, and H×E/Co=4.86. Besides, when the product was tested for chewing palatability by panelists, the product showed excellent chewing palatability and had very similar elasticity and texture to those of cooked natural meats.

What is claimed is:

1. A formed food product of microfibrillar protein, which comprises one part by weight of a bundle of microfibrillar protein (A) having a diameter of fiber 10μ or less and a heat resistant index of at least 100, and about 0.02 to 0.67 part by weight of a microfibrillar protein (B) having a diameter of fiber of 10μ or less and a heat resistant index of from 55 to the heat resistant index of the component (A)—10, wherein said heat resistant index is defined as the maximum temperature at which 90% or more of the microfibrils remain when the microfibrillar protein is kept in water of pH 5.5 at a fixed temperature for 30 minutes.

2. A formed food product according to claim 1, wherein the product has the following texture parameters of hardness (H), elasticity (E), and cohesiveness (Co) and the relation thereof (H×E/Co):

$4.55 \leq H \leq 7.50$
$0.70 \leq E \leq 1.35$
$0.60 \leq Co \leq 0.85$
$4.95 \leq H \times E/Co \leq 11.10$ said texture parameters being measured with a texturometer under the following conditions: temperature: 20° C., voltage: 2.5 V (using 1/5 attenuator), plunger: 13 mmφ aluminum plunger (plane type), clearance: 2 mm, thickness of test sample: 13 mm, chart speed: 750 mm/minute, bite speed: 12 bites/minute, and viscosity index: 8.5.

3. A formed food product according to claim 1, wherein the bundle of microfibrillar protein (A) has a heat resistant index of 100 to 130.

4. A formed food product according to claim 1, wherein the product contains at least one additive selected from the group consisting of a heat coagulable protein, fat and oil, emulsifier, starch, gum, seasoning, flavor, colorant and a natural material containing these additives as the main component in an amount of about 0.02 to 0.4 part by weight per 1 part by weight of the total weight of the mixture of the bundle of microfibrillar protein (A) and the microfibrillar protein (B).

5. A formed food product according to claim 4, wherein the product has the following texture paramenters:

$3.10 \leq H \leq 7.50$
$0.60 \leq E \leq 1.35$
$0.58 \leq Co \leq 0.85$
$3.50 \leq H \times E/Co \leq 11.10$.

6. A formed food product according to claims 4 or 5, wherein the heat coagulable protein is a member selected from the group consisting of egg white, egg yolk, milk whey protein, blood serum, animal meat, poultry meat, ground fish paste, gelatine, and a natural material containing these proteins as the main component.

7. A formed food product according to claim 6, wherein the heat coagulable protein is previously heated to coagulate it and then formed to a size of 10 to 120 mesh.

8. A formed food product according to claim 4, wherein the bundle of microfibrillar protein (A) has a heat resistant index of 100 to 130.

9. A formed food product according to claims 1, 2, 3, 4, 5, or 8 wherein the microfibrillar protein (B) is milk casein.

10. A process for the production of a formed food product of microfibrillar protein as set forth in claim 1 or 2, which comprises mixing one part by weight of a bundle of microfibrillar protein (A) having a diameter of fiber of 10μ or less and a heat resistant index of at least 100, and about 0.02 to 0.67 part by weight of a bundle of a microfibrillar protein (B) having a diameter of fiber of 10μ or less and a heat resistant index of from 55 to the heat resistant index of the component (A)—10, and molding the mixture at a temperature of lower than the heat resistant index of the component (A) but higher than the heat resistant index of the component (B) under a pressure of 0.1 to 50 kg/cm² for 30 seconds to 1 hour.

11. A process for the production of a formed food product of microfibrillar protein as set forth in claim 1 or 2, which comprises treating a bundle of microfibrillar protein (A) having a diameter of fiber of 10μ or less and a heat resistant index of at least 100 with a buffer solution of a pH of 6.0 to 6.9 to convert the surface of the bundle (A) into a bundle of fibers having a heat resistant index of from 55 to the heat resistant index of the component (A)—10 thus forming a material corresponding to the component (B), said treating effective to produce a converted material in the weight ratio of about 0.02 to 0.67 part per 1 part of the weight of (A), putting together a plurality of thus treated bundles (A), and then molding them at a temperature of lower than the heat resistant index of the bundle (A) but higher than the heat resistant index of the converted surface of the bundle under a pressure of 0.1 to 50 kg/cm² for 30 seconds to 1 hour.

12. A process for the production of a formed food product according to claim 11, wherein the bundles (A) treated with a buffer solution are put together with non-treated bundles of microfibrillar protein having a diameter of fiber of 10μ or less and a heat resistant index of 100 or more and then subjected to the molding.

13. A process for the production of a formed food product according to claim 10, wherein at least one additive selected from the group consisting of a heat coagulable protein, fat and oil, emulsifier, starch, gum, seasoning, flavor, colorant and a natural material containing these additives as the main component is added to the mixture of the components (A) and (B) before or after the molding in an amount of about 0.02 to 0.4 part by weight per 1 part by weight of the total weight of the mixture of the components (A) and (B).

14. A process for the production of a formed food product according to claim 13, wherein the heat coagulable protein is a member selected from the group consisting of egg wheite, egg yolk, milk whey protein, blood serum, animal meat, poultry meat, ground fish paste, gelatine, and a natural material containing these proteins as the main component.

15. A process for the production of a formed food product according to claim 14, wherein the heat coagulable protein is previously heated to coagulate it and then formed to a size of 10 to 120 mesh.

16. A process for the production of a formed food product according to claim 10, wherein the microfibrillar protein (B) is milk casein.

* * * * *